US008868033B1

(12) United States Patent
Malreddy et al.

(10) Patent No.: US 8,868,033 B1
(45) Date of Patent: Oct. 21, 2014

(54) METHOD AND SYSTEM FOR AVOIDING UNAUTHORIZED WIRELESS COMMUNICATION DEVICES AT A FEMTOCELL

(75) Inventors: Muralidhar Malreddy, Overland Park, KS (US); Ryan S. Talley, Overland Park, KS (US); Rajveen Narendran, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1025 days.

(21) Appl. No.: 12/759,347

(22) Filed: Apr. 13, 2010

(51) Int. Cl.
*H04M 1/66* (2006.01)
(52) U.S. Cl.
USPC ........ 455/410; 455/434; 455/456.1; 455/509; 455/522; 455/422.1; 370/338
(58) Field of Classification Search
CPC .................................. H04M 1/66; H04M 1/68
USPC ........... 455/410, 434, 456.1, 67.11, 509, 522, 455/411, 422.1, 414.2; 370/338, 329
See application file for complete search history.

(56) References Cited

U.S. PATENT DOCUMENTS

| 2005/0063349 | A1* | 3/2005 | LoGalbo et al. .............. 370/338 |
| 2009/0061873 | A1 | 3/2009 | Bao et al. |
| 2009/0080387 | A1* | 3/2009 | Dell'Uomo et al. .......... 370/338 |
| 2009/0215452 | A1* | 8/2009 | Balasubramanian et al. 455/434 |
| 2009/0280819 | A1 | 11/2009 | Brisebois et al. |
| 2010/0075658 | A1* | 3/2010 | Hou et al. .................. 455/422.1 |
| 2010/0144366 | A1* | 6/2010 | Ishii et al. .................. 455/456.1 |

OTHER PUBLICATIONS

Humblet et al., "System Design of cdma2000 Femtocells," IEEE Communications Magazine, Sep. 2009, p. 92-100.
Chandrasekhar et al., "Femtocell Networks: A Survey," IEEE Communications Magazine, vol. 46, No. 9, pp. 59-67 Sep. 2008.
Internet Networks: Wired, Wireless, and Optical Technologies.

* cited by examiner

*Primary Examiner* — Shahriar Behnamian

(57) ABSTRACT

Methods and systems are provided for reducing a number of unauthorized wireless communication devices (WCDs) on a femtocell. A femtocell may initially provide wireless service on a first femtocell carrier. The femtocell may subsequently receive a registration request from a WCD on the first femtocell carrier. The femtocell may then determine whether the WCD is authorized to receive wireless services from the femtocell. Responsive to making a determination that the WCD is not authorized to receive wireless services, the femtocell may switch to providing service on a second femtocell carrier different than the first.

22 Claims, 5 Drawing Sheets

METHOD AND SYSTEM FOR AVOIDING UNAUTHORIZED WIRELESS COMMUNICATION DEVICES AT A FEMTOCELL

BACKGROUND

1. Cellular Wireless Networks

Many people use wireless communication devices (WCDs), such as cell phones, computers, laptop computers, and personal digital assistants (PDAs), to communicate with cellular wireless networks. Service providers that operate these wireless networks typically distribute WCDs to their subscribers, perhaps by selling the WCDs at retail outlets or over the Internet, or perhaps by offering WCDs at no cost to people that subscribe to a particular service plan.

Service providers then typically assign each WCD a telephone directory number—often known as a mobile identification number (MIN) or mobile directory number (MDN)—under which a WCD may operate. Via a manual or over-the-air provisioning process, the service provider will cause the WCD to store its MIN in its Number Assignment Module (NAM). Furthermore, a WCD is typically provided at the time of manufacture with an electronic serial number (ESN), which identifies the WCD as a unique physical device.

These WCDs and networks typically communicate with each other over a radio frequency (RF) air interface according to a wireless protocol such as Code Division Multiple Access (CDMA), perhaps in conformance with one or more industry specifications such as IS-95 and IS-2000. Wireless networks that operate according to these specifications are often referred to as "1xRTT networks" (or "1x networks" for short), which stands for "Single Carrier Radio Transmission Technology." Another protocol that may be used is known as Evolution Data Optimized (EV-DO), perhaps in conformance with one or more industry specifications such as IS-856. Other protocols may be used as well, such as Global System for Mobile Communications (GSM), Time Division Multiple Access (TDMA), WiMax, and/or any others.

These networks typically provide services such as voice, Short Message Service (SMS) messaging, and packet-data communication, among others, and typically include a plurality of base stations, each of which provide one or more coverage areas, such as cells and sectors. When a WCD is positioned in one of these coverage areas, it can communicate over the air interface with the base station, and in turn over one or more circuit-switched and/or packet-switched signaling and/or transport networks to which the base station provides access.

The base stations for these networks are typically not associated with any subscriber or small group of subscribers in particular; rather, they are placed in publicly-accessible locations and are used by the service provider's customers generally. These base stations collectively blanket large geographic areas with coverage; as such, they are referred to generally and herein as "macro (or macro-network) base stations" and the network they collectively form—or to which they collectively belong—is referred to generally and herein as the "macro network."

WCDs and macro base stations conduct communication sessions (e.g., voice calls and data sessions) over frequencies known as carriers, each of which may actually be a pair of frequencies, with the base station transmitting to the WCD on one of the frequencies, and the WCD transmitting to the base station on the other. This approach is known as frequency division duplex (FDD). The base-station-to-WCD link is known as the forward link, while the WCD-to-base-station link is known as the reverse link.

WCDs are programmed to use a pre-determined algorithm to select one of the carriers to use in communications with a base station. When a WCD is not engaged in an active communication session, the WCD does what is known as idling on the selected carrier, which means among other things that the WCD is tuned to that carrier for receiving page messages, SMS messages, and other similar messages, and that the WCD will also send access requests for call origination and other purposes to the base station on that carrier.

2. Femtocells

Many macro-network subscribers, including private consumers and businesses, among others, in addition to having wireless service (which may include data service) for their WCD (or WCDs), also have high-speed (a.k.a. "broadband") Internet access through another communication channel. This other channel may be cable-modem service, digital-subscriber-line (DSL) service, satellite-based Internet service, T1 service, and/or some other option.

In an exemplary arrangement, a user may have a cable modem connected (a) via coaxial cable to a cable provider's network and (b) via Ethernet cable to a local wireless network (e.g., IEEE 802.11 Wi-Fi-enabled router). The router may include one or more Ethernet ports to which additional computers or other devices may also be connected, and may include wireless-access-point functionality, providing a Wi-Fi packet-data interface to, for example, laptop computers, digital video recorders (DVRs), appliances, and/or any other computing devices or wireless network adapters.

To address gaps in macro-network coverage (e.g., in buildings and homes) and for other reasons, macro-network service providers have recently begun offering their clients devices referred to herein as femtocells.

A typical femtocell may be approximately the size of a desktop phone or Wi-Fi access point, and is functionally a low-power, low-capacity version of a macro base station. Thus, a typical femtocell will use a normal power outlet, perhaps with a transformer providing a DC power supply. The femtocell may have a wired (e.g., Ethernet) or wireless (e.g., Wi-Fi) connection with the user's router and/or cable modem, and would thus have connectivity to the Internet and/or one or more other packet-data networks via the user's broadband connection. The femtocell may then also have access to the devices connected to the user's router through the router's Ethernet and/or Wi-Fi interfaces.

A femtocell may establish a virtual-private-network (VPN) connection over the Internet with an entity (e.g., a VPN terminator) on the wireless-service (macro-network) provider's core network, and thereby be able to securely communicate with the VPN terminator and other entities on that core network and beyond. The femtocell may thus provide additional functionality to WCDs it serves via access to the core network.

The femtocell also has a wireless-communication (e.g., CDMA) interface that is compatible with the user's WCD(s), such that the femtocell may act as a micro base station, providing local wireless coverage on the wireless-service provider's network via the user's Internet connection. Usually, a femtocell will provide service on a single RF carrier (or on a single carrier per technology, where multiple technologies (such as CDMA and EV-DO) are supported), and also transmit what is known as a pilot beacon, which includes administrative messages and parameters that WCDs can use to connect with the femtocell.

In particular, the pilot beacon identifies one or more of the channels at the femtocell known as the pilot, paging, and sync channels (e.g., the "overhead channels"). The femtocell's pilot channel may serve as a demodulation reference and handoff-level-measurement signal. The femtocell's sync channel may carry a repeating message that identifies the transmitting station and conveys timing and system-configuration information to the WCD. The femtocell's paging channel may provide a mechanism for the femtocell to transmit notification of incoming calls when there are no assigned traffic channels between the femtocell and a given WCD. The single RF carrier that the femtocell uses to provide service is typically different from those used by the macro network, but in some instances may be the same as one of those used by the macro network (e.g., a shared carrier).

Femtocells may also include a location-determination module (e.g., some combination of hardware, firmware, and/or software). For example, the location-determination module may comprise a Global Positioning System (GPS) receiver for receiving and decoding GPS signals for use in determination of location, as well as for use in synchronizing operations with other femtocells and with the macro network based on timing information embedded in the GPS signals. Other location-determination methods could also be used. In other instances, a femtocell may not have any location-determination module or capability.

OVERVIEW

As explained above, femtocells are typically low-cost devices that by design have a reduced set of resources and capabilities including, e.g., reduced RF power, reduced number of channel elements, and reduced RF-carrier capability as compared to macro-network base stations (BTSs). Additionally, femtocells often provide the one or more WCDs operated by their registered owners with unlimited voice and data usage when operating within the femtocell's limited coverage area. In most cases, then, both the registered owner of the femtocell and the wireless-network operator have an interest in preventing unauthorized use of a femtocell's resources: the former to, at a minimum, prevent use of resources that may otherwise be allocated to the registered owner (or owners); and the latter to prevent siphoning of revenue that would otherwise be collected from the unauthorized femtocell user for use of the carrier's macro-network resources, as well as the potential degradation of the paying subscriber's user experience, among other issues.

To address these identified issues, and others, the present methods and systems advantageously arrange and program the femtocell to recognize a registration (or perhaps an attempted registration) of an unauthorized WCD, and to redirect that unauthorized WCD to a macro-network carrier. Indeed, the present methods and systems involve femtocells arranged and programmed to carry out such avoidance and redirection of unauthorized WCDs to a macro-network carrier while minimizing any potential impact to other WCDs in the femtocell's coverage area. In one aspect, an exemplary embodiment may include a femtocell receiving a registration request from a WCD, and responsively determining whether the WCD is authorized to receive wireless services from the femtocell.

The femtocell may make such a determination at least in part by referencing at least one of a whitelist and a blacklist of identifiers associated with authorized and unauthorized WCDs, respectively. Alternatively, the femtocell may determine whether the WCD is authorized by transmitting a (e.g., SIP) message to the core wireless network and receiving an authorization response from the core network. And other types of messages and methods of authorization could be used instead or in addition.

If the femtocell determines that the WCD is unauthorized, it may take steps to avoid and thus redirect the WCD to a macro-network carrier in order to prevent excess usage of the limited resources of the femtocell, and to prevent unauthorized use of the unlimited voice and data services often available via femtocells. In an embodiment, such avoidance and redirection may involve the femtocell identifying a second femtocell carrier (different from a first femtocell carrier) on which to provide service, and switching to providing service on that second femtocell carrier. By the femtocell switching to providing service on the second femtocell carrier rather than the first, the unauthorized WCD may detect the unavailability of the first femtocell carrier on which it registered, and programmatically seek a macro-network carrier.

The second femtocell carrier to which the femtocell switches may be a non-shared carrier, or may be a macro-network carrier different from the first femtocell carrier, among other options. The femtocell may identify the second femtocell carrier on which to provide service at least in part by accessing an external database, retrieving a list of carriers (perhaps based at least in part on a current geographic location of the femtocell), and selecting a different carrier from the list of carriers. Other methods of identifying an available carrier may also be used. As a result of the switch, resources may be freed at the femtocell to serve authorized users. Furthermore, phone calls thereafter placed by the unauthorized WCD may be routed via the macro-network, and the unauthorized WCD may accordingly be properly billed for use of macro-network resources.

In one embodiment, the femtocell may further respond to identifying a registration of an unauthorized WCD by ceasing, perhaps for a specific amount of time, transmission of its pilot beacon on the femtocell carrier from which it switched in order to avoid providing the unauthorized WCD with the femtocell's new channel information. After refraining for a period of time, the femtocell may re-enable transmission of its pilot beacon on the femtocell carrier from which it switched.

In an embodiment, the femtocell may attempt to switch from a first femtocell carrier that is a shared carrier to a different shared carrier ("a second shared carrier"). In the event that the unauthorized WCD follows the femtocell to the second shared carrier, the femtocell may then proceed to switch to a non-shared carrier.

In an embodiment, the femtocell may refrain from taking any action to avoid and thus redirect unauthorized WCDs to macro-network carriers until at least a threshold number of unauthorized WCDs become registered with the femtocell. For example, the femtocell may refrain from switching to providing service on a different carrier until at least three or more unauthorized WCDs are registered with the femtocell. Subsequently, the femtocell may redirect one or more, perhaps all, of these registered unauthorized WCDs to a macro-network carrier in the same or a similar manner as set forth above. Alternatively or in addition, other thresholds perhaps could be used as well in terms of remaining available capacity (e.g. channel elements), percentage or fractional capacity, time of day, etc.

In an embodiment, the femtocell may first determine whether any authorized WCDs are idling or receiving service on the femtocell's carrier. In order to avoid negatively affecting the service quality provided to authorized WCDs, the femtocell may refrain from switching to providing service on a different carrier if it detects one or more authorized WCDs.

Once the authorized WCDs have powered down or handed off away from the femtocell (including to a macro-network BTS), and only unauthorized WCDs remain on the femtocell's carrier, the femtocell may then proceed to switch to providing service on the different carrier.

In some embodiments, the femtocell may refrain from switching to providing service on a different carrier if one or more authorized WCDs are actively engaged in a (e.g., voice or data) call via the femtocell (e.g., the authorized WCDs are in active mode via the femtocell), but may switch to a different carrier if all registered authorized WCDs are simply idling on the current femtocell carrier. In such embodiments, the femtocell may inform the authorized WCDs of the switch, but not so inform the unauthorized WCDs. In some embodiments, authorized WCDs may be provisioned (e.g., periodically and/or upon registration with the femtocell) with data that informs the authorized WCDs as to what may be a sequence of carriers that the femtocell will try, so that authorized WCDs (but not unauthorized WCDs) will know where to look when they lose communication with the femtocell on the first femtocell carrier. And certainly other similar approaches could be used by a femtocell to favor authorized WCDs over unauthorized WCDs.

In accordance with the foregoing embodiments, a femtocell may redirect unauthorized WCDs to macro-network carriers at least in part by switching to providing service over a different carrier. These as well as other aspects, advantages, and alternatives will become apparent to those of ordinary skill in the art by reading the following detailed description, with reference where appropriate to the accompanying drawings. Further, it should be understood that the embodiments described in this overview and elsewhere herein are intended to be examples only and do not to limit the scope of the claims.

BRIEF DESCRIPTION OF THE DRAWINGS

Various exemplary embodiments are described herein with reference to the following drawings, wherein like numerals denote like entities.

DETAILED DESCRIPTION

1. Exemplary Architecture

Figure 1:
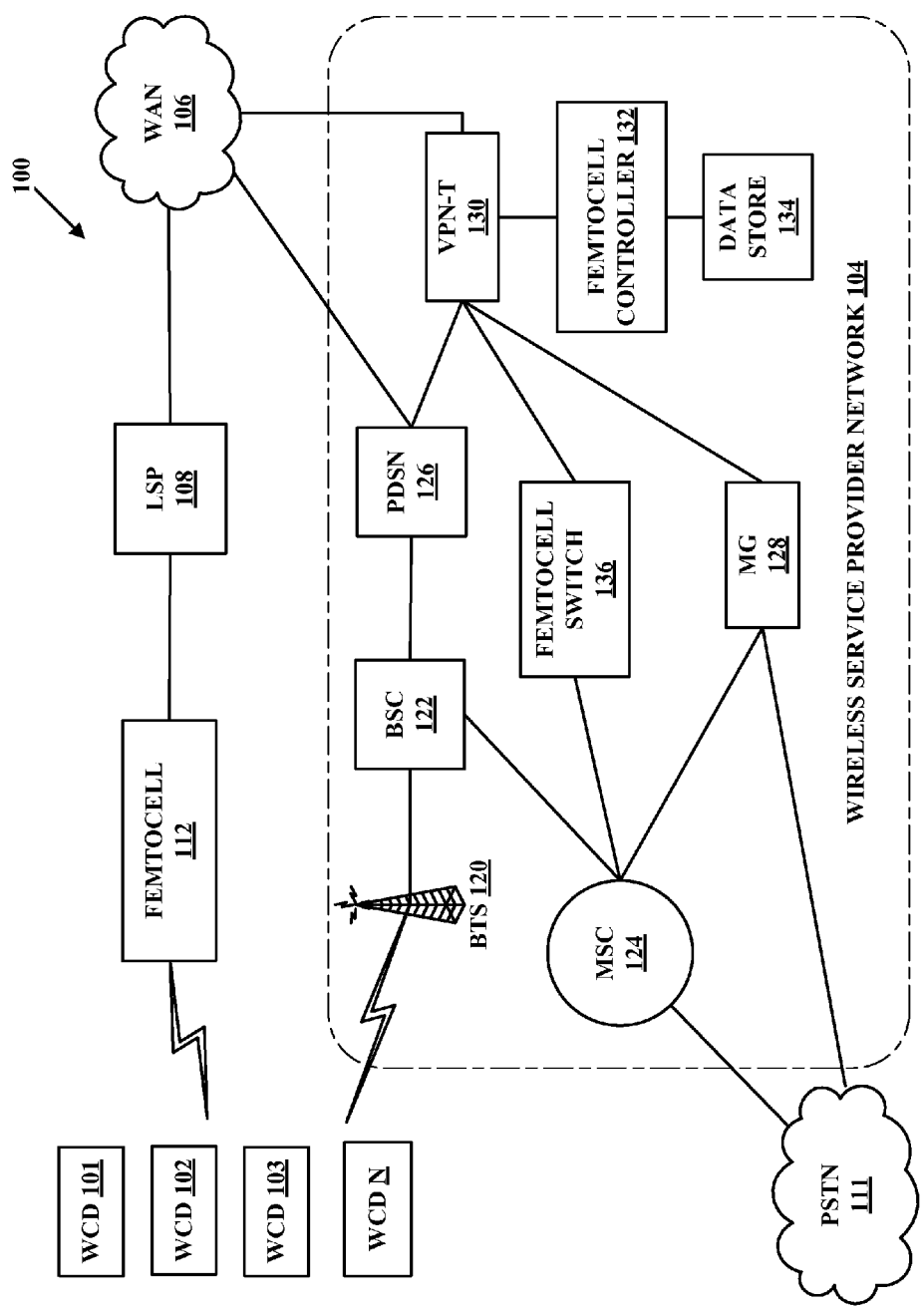
FIG. 1 is a simplified block diagram of a communication system, in accordance with at least one embodiment.

FIG. 1 is a simplified block diagram of a communication system, in accordance with an exemplary embodiment. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, a communication system 100 includes at least first, second, and third wireless communication devices (WCDs) 101, 102, and 103 and potentially including up to "N" WCDs (where N is, for example, less than or equal to 50), a wireless service provider network (WSPN) 104, a Wide Area Network (WAN) 106, a local service provider (LSP) 108, a femtocell 112, and a public switched telephone network (PSTN) 111.

The WSPN 104 includes a macro base transceiver station (BTS) 120, a base station controller (BSC) 122, a mobile switching center (MSC) 124, a packet data serving node (PDSN) 126, a media gateway (MG) 128, a VPN terminator (VPN-T) 130, a femtocell controller 132, a data store 134, and a femtocell switch 136. Additional entities could be present, such as additional mobile stations in communication with BTS 120 and additional entities in communication with WAN 106 and/or PSTN 111, etc. Also, there could be one or more devices and/or networks making up at least part of one or more communication links.

Figure 2:
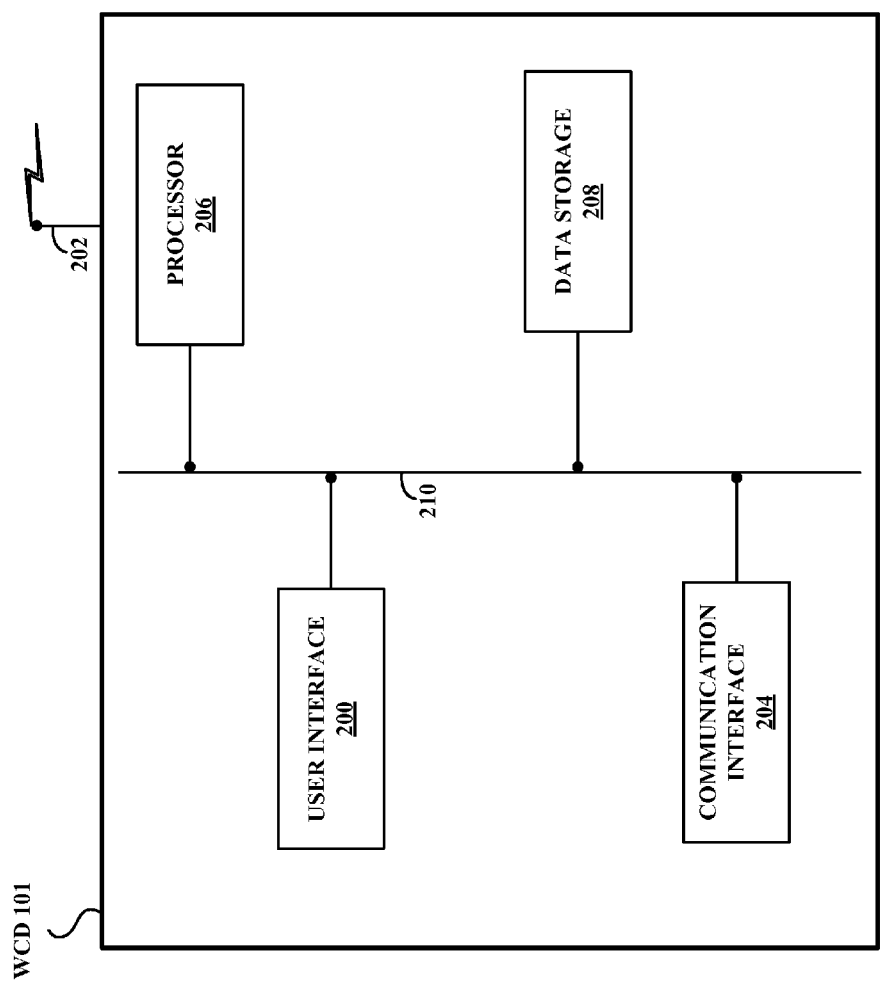
FIG. 2 is a simplified block diagram of a wireless communication device (WCD), in accordance with at least one embodiment.

WCDs 101-103 may each be or include any mobile device arranged to carry out the WCD functions described herein. WCD 101 may be the same or different than WCD 102 and/or WCD 103. While WCD 101 will be used to describe WCD features in general, it should be understood that any of the forthcoming features described relative to WCD 101 may be equally applicable to WCDs 102 and 103. FIG. 2 is a simplified block diagram of a WCD 101, in accordance with an exemplary embodiment. As shown, WCD 101 may include a user interface 200, a wireless-communication interface 202/204, a processor 206, and data storage 208 containing instructions executable by the processor 206 for carrying out WCD functions. The user interface 200 may include buttons, a touch-screen, a microphone, and/or any other elements for receiving inputs, as well as a speaker, one or more displays, and/or any other elements for communicating outputs.

The wireless-communication interface 202/204 of the WCD 101 may include an antenna 202 and a chipset 204 suitable for communicating with one or more macro base stations 108 and/or one or more femtocells 112 over suitable air interfaces. For example, the chipset 204 could be suitable for CDMA communication. The chipset 204 or wireless-communication interface 202/204 in general may also, or instead, be able to communicate with other types of networks and devices, such as EV-DO networks, Wi-Fi networks, infra-red devices, Bluetooth devices, and/or one or more additional types of networks and devices. The processor 206 and data storage 208 may be any suitable components known to those of skill in the art.

Returning to FIG. 1, WSPN 104 may encompass all or some of the network elements depicted in FIG. 1 as being included in its dashed-rectangle shape. In general, there may be more and/or different communication links among entities within WSPN 104 than those set forth in FIG. 1, and there may be more and/or different connections between WSPN 104 and outside entities. Furthermore, there may be a core packet network (not depicted) making up part of WSPN 104, which may enable devices therein to communicate with each other. There may also be one or more other packet-data networks and/or elements, one or more circuit-switched networks and/or elements, one or more signaling networks and/or elements, and/or one or more of any other suitable network(s) and/or element(s).

WAN 106 may be the well-known global packet-data network generally referred to as the Internet. However, WAN 106 may also be or include one or more other packet-data networks. As such, WAN 106 may include one or more other wide area networks, one or more local area networks, one or more public networks, one or more private networks, one or more wired networks, one or more wireless networks, and/or one or more networks of any other type. Devices in communication with WAN 106 may exchange data using a packet-switched protocol such as the Internet Protocol (IP), and may be identified by an address such as an IP address.

LSP 108 may be any local service provider network that provides local packet-switched communications services to end-user residential and/or business customers and provides the end-user customers with access to the WAN 106. The LSP 108 may provide services to the end-user customers via data over cable service interface specification (DOCSIS), digital subscriber line (DSL), T-carrier, WiMAX, CDMA, or any other now-existing or future access technologies. The LSP 108 may, for example, provide the end-user customer with the necessary electrical medium connection from the premises of the femtocell 112 to the LSP's own network, and may provide the femtocell 112 with one or more IP addresses that may be used to send data across the LSP's network 108 and ultimately to the WAN 106. The LSP's network 108 may comprise one or more switches, routers, dynamic host configuration protocol (DHCP) servers, firewalls, and/or other devices that operate to connect end-user customers to the WAN 106.

Figure 3:
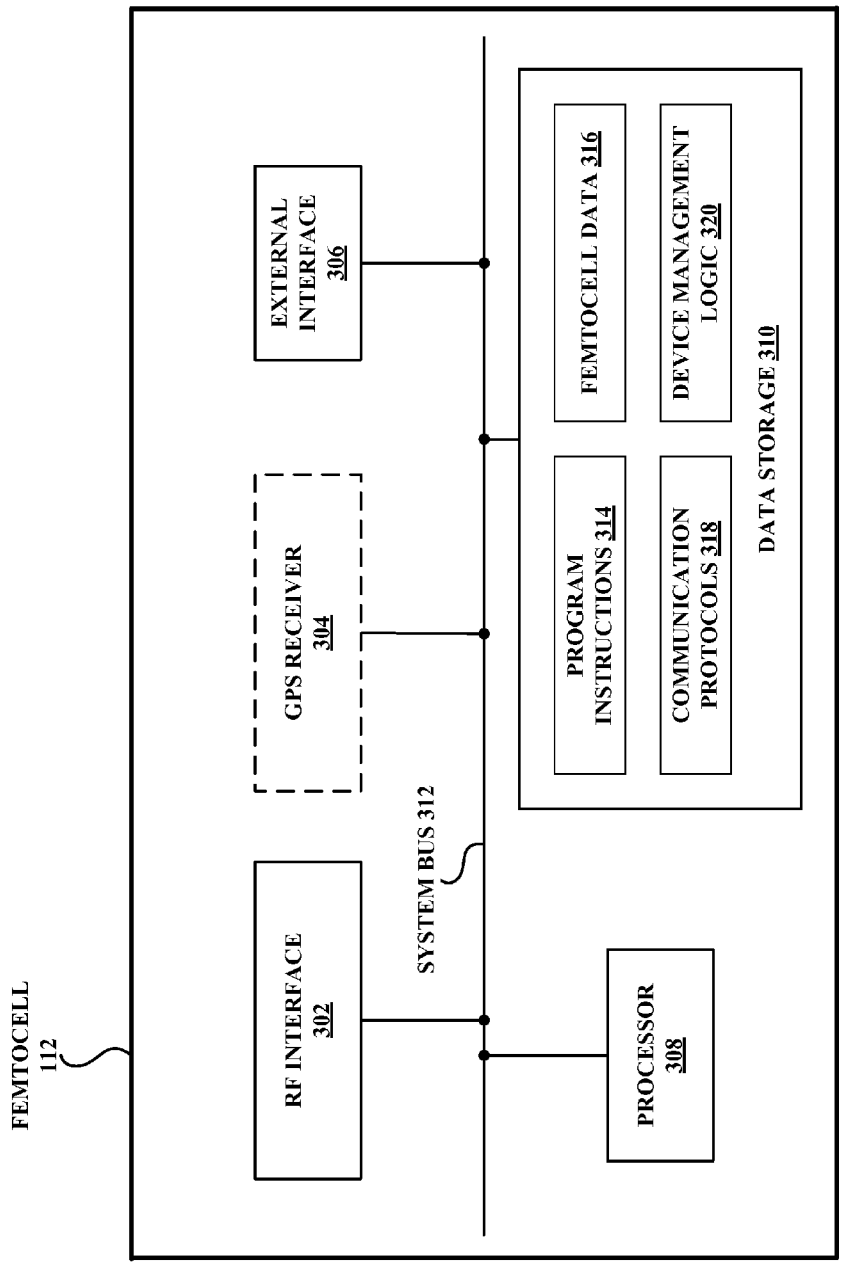
FIG. 3 is a simplified block diagram of a femtocell, in accordance with at least one embodiment.

Femtocell 112 may be any computing and communication device arranged to carry out femtocell functions. As such, femtocell 112 may include a communication interface, a processor, and data storage containing instructions executable by the processor for carrying out the femtocell functions described herein. FIG. 3 depicts an exemplary diagram of femtocell 112, which includes an RF interface 302, an optional GPS receiver 304, an external interface 306, a processor 308, and data storage 310, all communicatively linked by a system bus 312. Note that femtocell 112 could have additional and/or different components than those set forth in FIG. 3, and that this structure is provided by way of example only.

RF interface 302 may include one or more antennas, one or more chipsets, a set of one or more channel elements, and/or one or more other components suitable for providing a wireless coverage area according to a wireless-communication protocol such as CDMA (and/or one or more other wireless technologies). GPS receiver 304 may be any known or hereafter-developed GPS receiver, suitable for receiving and decoding GPS signals for location and timing purposes, perhaps among other purposes. In some embodiments, a femtocell may have a location module in addition to or instead of a GPS receiver, or perhaps no GPS receiver or location module at all.

External interface 306 may provide a wired and/or wireless packet-data interface for communicating with a device such as a switch/router in a local-area network (not pictured) local to the femtocell 112 or with similar devices in the LSP's network 108. Processor 308 may comprise multiple (e.g., parallel) processors, such as a general purpose microprocessor and/or a discrete digital signal processor. The data storage 310 may take various forms, in one or more parts, such as a non-volatile storage block and/or a removable storage medium, and may include (a) program instructions 314 executable by processor 308 for carrying out the femtocell functions described herein, (b) femtocell data 316, which may be any operational data or other type of data stored for use by femtocell 112, (c) communication protocols 318, facilitating and enabling communication with one or more other devices, and (d) device management logic 320, perhaps for memory and file management.

Macro BTS 120 may be any network element arranged to carry out macro-BTS functions. As such, macro BTS 120 may include a communication interface, a processor, and data storage containing instructions executable by the processor to carry out the macro-BTS functions. The communication interface may include one or more antennas, chipsets, and/or other components for providing one or more CDMA (and/or any other protocol(s)) coverage areas such as cells and sectors, for communicating with WCDs such as WCD 101 over an air interface. The communication interface may also include one or more wired (e.g., Ethernet) and/or wireless (e.g., Wi-Fi) interfaces for communicating with at least BSC 122.

BSC 122 may be any network element arranged to carry out BSC functions. As such, BSC 122 may include a communication interface, a processor, and data storage containing instructions executable by the processor to carry out BSC functions. The communication interface may include one or more wired and/or wireless interfaces for communicating with at least macro BTS 120, MSC 124, femtocell switch 136, and PDSN 126. In general, BSC 122 functions to control one or more macro BTSs such as macro BTS 120, and to provide those one or more macro BTSs with connections to devices such as MSC 124, femtocell switch 136, and/or PDSN 126.

Note that the combination of macro BTS 120 and BSC 122 may be considered a macro base station. However, macro BTS 120 or BSC 122 could, taken alone, be considered a macro base station as well. Furthermore, a macro base station may be considered to be either or both of those devices, and perhaps make use of one or more functions provided by MSC 124, PDSN 126, femtocell switch 136, and/or any other entity. And it should be noted that the macro network and/or the femtocell(s) described herein may operate according to CDMA, EV-DO, iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), Bluetooth, infrared, and/or any other wireless technology or technologies now known or later developed.

MSC 124 may be any networking element arranged to carry out MSC functions. Thus, MSC 124 may include a communication interface, a processor, and data storage containing instructions executable by the processor to carry out MSC functions. The communication interface may include one or more wired and/or wireless interfaces for communicating with at least BSC 122, femtocell switch 136, and PSTN 111. In general, MSC 124 acts as a switch between (a) PSTN 111 and one or more BSCs such as BSC 122 and/or (b) between PSTN 111 and one or more femtocells 112 via femtocell switch 136, facilitating communication between WCDs 101-103 and PSTN 111.

PDSN 126 may be any networking element arranged to carry out PDSN functions. As such, PDSN 126 may include a communication interface, a processor, and data storage containing instructions executable by the processor for carrying out PDSN functions. The communication interface may include one or more wired and/or wireless interfaces for communicating with at least BSC 122, WAN 106, and VPN terminator 130. In general, PDSN 126 acts as a network access server between WAN 106 and BSCs such as BSC 122, facilitating packet-data communication between WCDs 101-103 and WAN 106 via macro base stations 120.

MG 128 may be any networking element arranged to carry out media-gateway functions. As such, MG 128 may include a communication interface, a processor, and data storage containing instructions executable by the processor for carrying out media-gateway functions. The communication interface may include a circuit-switched interface and a packet-switched interface. MG 128 may (a) receive packet-based communications from within the WSPN 104, convert those to circuit-switched communications, and pass them to PSTN 111 and (b) receive circuit-switched communications from PSTN 111, convert those to packet-based communications, and pass them to another device within WSPN 104.

VPN terminator 130 may be any networking element arranged to carry out VPN-terminator functions. Thus, VPN terminator 130 may include a communication interface, a processor, and data storage containing instructions executable by the processor for carrying out VPN-terminator functions. The communication interface may include one or more wired and/or wireless interfaces for communicating with at least femtocell controller 132, PDSN 126, femtocell switch 136, MG 128, and WAN 106. In general, VPN terminator 130 functions to establish secure VPN connections over WAN 106 with femtocells such as femtocell 112, enabling the femtocells to securely communicate with devices on the WSPN 104, such as femtocell controller 132, and perhaps beyond.

Femtocell controller 132 may be any networking element arranged to carry out femtocell-controller functions. Thus, femtocell controller 132 may include a communication interface, a processor, and data storage containing instructions executable by the processor for carrying out femtocell-controller functions. The communication interface may include one or more wired and/or wireless interfaces for communicating with at least VPN terminator 130, along with perhaps one or more other entities on WSPN 104, and beyond.

Among other functions, femtocell controller 132 communicates via VPN terminator 130 with femtocells such as femtocell 112. Femtocell controller 132 may receive requests from various femtocells for access to a data store 134. Femtocell controller 132 may perform the requested functions via data store 134 and transmit replies to the requesting femtocell 112. Femtocell controller 132 may also be operable to select various operational parameters for femtocells (e.g., carrier, PN offset, whether to broadcast a pilot-beacon, contents of any pilot beacon to be broadcast, transmission-power level, channel-list messages, candidate carriers for pilot-beacon broadcasts), and to transmit those parameters to a femtocell, perhaps along with other configuration data and messaging.

Data store 134 may provide data storage facilities accessible by the femtocell controller 132 and/or femtocell 112. Although shown separately in FIG. 1, the data store 134 may otherwise be integrated with the femtocell controller 132. Alternatively, the data store 134 may be disposed outside the WSPN 104 and accessible via the WAN 106. When disposed outside the WSPN 104, additional access and control logic may be provided for retrieving data from data store 134 in accordance with access requests from femtocells 112.

The data store 134 may store and maintain, for example, one or more blacklists and/or one or more whitelists for determining WCDs authorized to utilize a femtocell such as femtocell 112. For example, the data store 134 may store a blacklist that contains identifiers of WCDs that are not authorized to receive service from one or more particular femtocells, or perhaps that are not authorized to receive service from any femtocell. Alternatively, or in addition, the data store 134 may store a whitelist that contains identifiers of WCDs that are authorized to receive service from one or more particular femtocells, or perhaps that are authorized to receive service from any and all femtocells.

The femtocell 112, when determining whether a particular WCD such as WCD 101 is authorized to receive wireless services from the femtocell 112, may access the data store 134 and use information retrieved from the blacklist(s) and/or whitelist(s) stored at the data store 134 in determining whether WCD 101 is authorized to receive services from the femtocell 112.

Femtocell switch 136 may be any networking element arranged to carry out femtocell-switch functions. As such, femtocell switch 136 may include a communication interface, a processor, and data storage containing instructions executable by the processor for carrying out femtocell-switch functions. The communication interface may include one or more wired and/or wireless interfaces for communicating with at least MSC 124 and VPN terminator 130. In general, femtocell switch 136 acts as a switch between MSC 124 and VPN terminator 130, enabling WCDs 101-103 communicating via femtocells 112 to engage in calls over PSTN 111 via MSC 124.

2. Exemplary Operation

Figure 4:
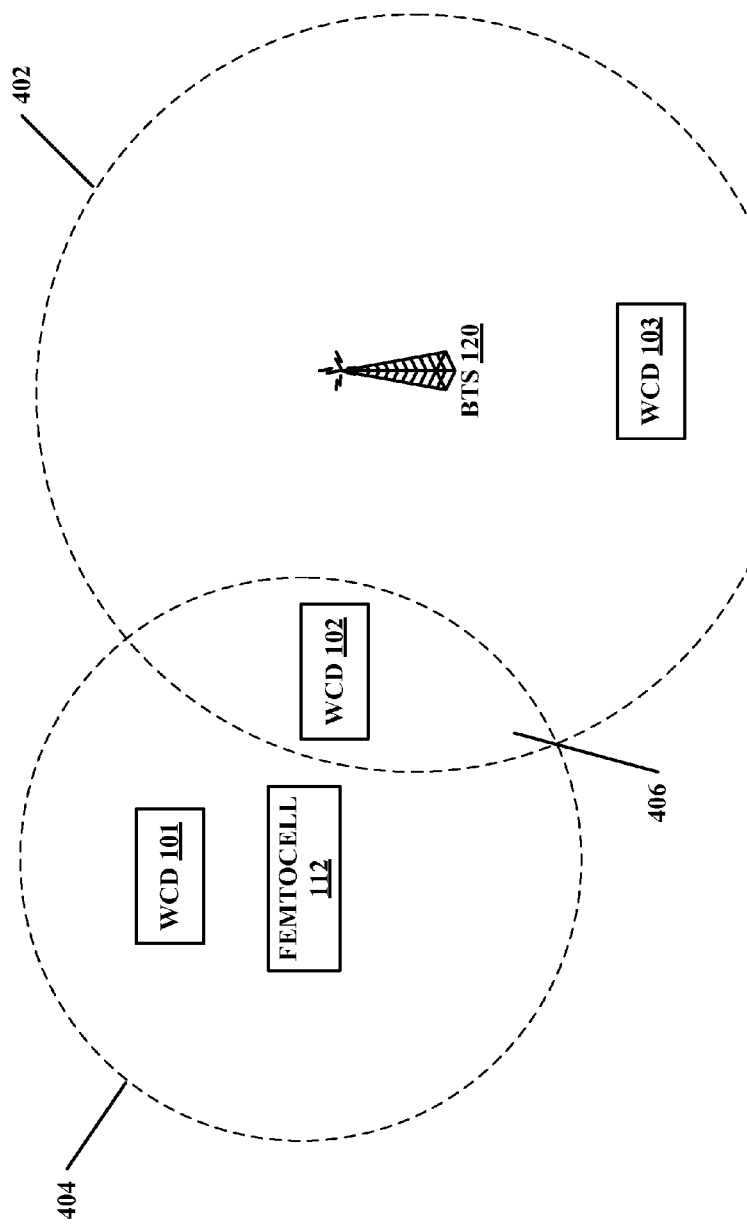
FIG. 4 is a simplified diagram illustrating multiple overlapping coverage areas in which at least one embodiment may be employed.
Figure 5:
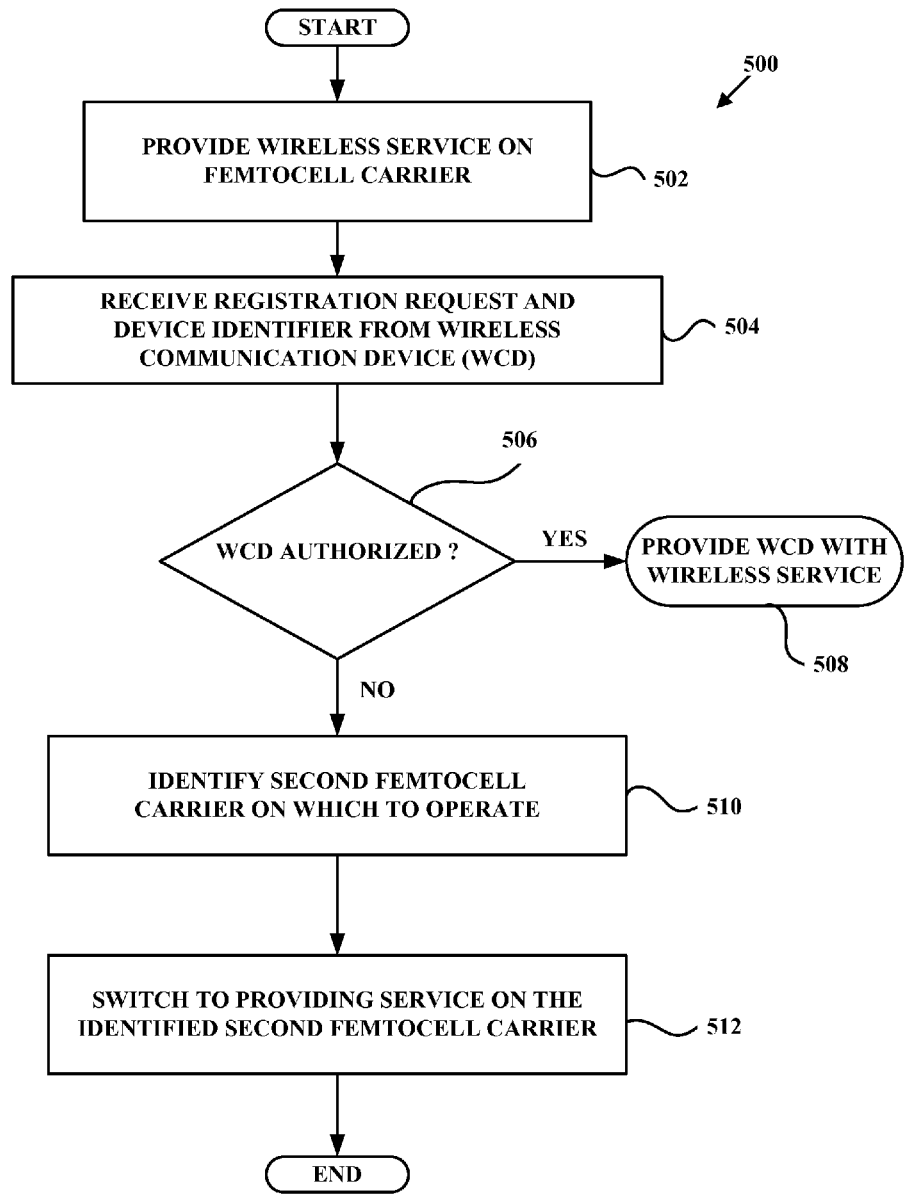
FIG. 5 is a flowchart of a method, in accordance with at least one embodiment.

FIG. 4 depicts an example arrangement of WCDs 101-103, and FIG. 5 depicts a flowchart of an exemplary method that may be carried out, in accordance with at least one embodiment. In particular, FIG. 5 depicts a method 500 for a femtocell such as femtocell 112 to reduce a number of unauthorized WCDs registered on the femtocell 112.

As shown in FIG. 4, BTS 120 and femtocell 112 have respective coverage areas 402 and 404. Although coverage areas 402 and 404 are shown in a circular geometric area in FIG. 4 for ease of reference, actual coverage areas produced by a femtocell and a BTS will of course depend upon the terrain surrounding the respective devices, perhaps among other factors. Coverage areas 402 and 404 overlap in coverage area 406, potentially allowing WCDs positioned within the overlapping coverage area 406 to receive wireless service from either femtocell 112 or BTS 120. While WCDs 101-103 are illustrated within the coverage areas 402 and 404, it should be understood that any number of devices may be situated within coverage areas 402 and 404 at any given time.

As depicted in FIG. 4, WCD 101 is positioned in coverage area 404 and is authorized to receive wireless service from, and actually receives wireless service from, femtocell 112. WCD 103 is positioned in coverage area 402 and is authorized to receive wireless service from, and actually receives wireless service from, BTS 120. WCD 102 is positioned within the overlapping coverage area 406 and may potentially receive service from femtocell 112. It is presumed for this description, however, that WCD 102 is not authorized to receive service from femtocell 112, and is currently receiving service from the macro-network via BTS 120.

As shown in FIG. 5, the method 500 begins at step 502, when femtocell 112 provides wireless service on a first femtocell carrier. At step 504, the femtocell 112 receives a registration request and device identifier from WCD 102. At step 506, the femtocell 112 determines whether WCD 102 is authorized to receive service from femtocell 112. If femtocell 112 determines that the WCD 102 is authorized to receive service from femtocell 112, at step 508 femtocell 112 begins providing service to the WCD 102. Alternatively, if femtocell 112 determines that the WCD 102 is not authorized to receive service from femtocell 112, at step 510 femtocell 112 identifies a second femtocell carrier, different from the first femtocell carrier, on which to provide wireless service, and at step 512, switches to providing service on that identified second femtocell carrier. These steps are further described below.

i. Provide Wireless Service on the First Femtocell Carrier

At step 502, the femtocell 112 provides wireless service on a first femtocell carrier, which may include providing a pilot channel (and/or other overhead channels) on the first femtocell carrier. Additionally, the femtocell 112 may transmit a pilot beacon on a macro-network carrier. For the purposes of this example only, the femtocell 112 transmits a pilot beacon on a same macro-network carrier on which WCD 102 is currently receiving service from macro-network BTS 120.

As noted earlier, the pilot beacon may include messages and parameters that the WCD 102 may use to initially connect with the femtocell 112 or to facilitate handoff from the macro-network carrier (from BTS 120) to the first femtocell carrier, among other possibilities. The messages and parameters may inform the WCD 102 of the first femtocell carrier, and the WCD 102 may subsequently use this information to transmit a registration request to the femtocell 112 on the first femtocell carrier.

The femtocell's 112 pilot channel may serve as a demodulation reference and handoff level measurement signal for WCD 102. In addition to the pilot channel, the femtocell 112 may also provide other overhead channels, such as a sync channel and a paging channel on the first femtocell carrier. The femtocell's 112 sync channel may carry a repeating message that identifies the femtocell 112 and conveys timing and system configuration information. The femtocell's 112 paging channel may provide a mechanism for the femtocell 112 to transmit notification of incoming calls when there are no assigned traffic channels between the femtocell 112 and a WCD idling on the first femtocell carrier.

The first femtocell carrier may be a shared carrier. In a shared-carrier scenario, the femtocell 112 may not broadcast the pilot beacon on the shared carrier, but may broadcast its pilot beacon on all other macro network carriers in the vicinity of the femtocell 112, or on a subset thereof.

Alternatively, the first femtocell carrier may be a non-shared carrier, e.g., one that is not being used by the macro network in the area surrounding the femtocell 112. In a non-shared-carrier scenario, femtocell 112 may broadcast its pilot beacon on all of the macro-network carriers within the vicinity of the femtocell 112, or on a subset thereof.

In the event that a plurality of macro-network carriers are being used in the vicinity of the femtocell 112, the pilot beacon transmitted by the femtocell 112 may repeatedly hop from one macro-network carrier to another within a period of time in order to advertise the femtocell's 112 services to WCDs operating on varying macro-network carriers (e.g., a frequency-hopping pilot beacon).

In this example, WCD 102 may detect the first femtocell carrier (perhaps after receiving the pilot beacon transmitted by femtocell 112 on one of the macro-network carriers) and may determine whether it should handoff service to the femtocell 112. The process of determining whether to handoff service to the femtocell 112 may take many forms, and may take into consideration many variables, including, for example, signal strengths of the respective signals received from the femtocell 112 and the BTS 120. Once WCD 102 determines that it should handoff service to the femtocell 112, it may generate and transmit a registration request and device identifier to femtocell 112.

Although the WCD 102 in this example is described as being involved in a handoff from macro-network BTS 120, WCD 102 could simply detect the first femtocell carrier on its own, perhaps after powering up within the femtocell 112 coverage area 404. WCD 102 may then generate and transmit a registration request and device identifier to femtocell 112. Other examples are possible as well.

ii. Receive Registration Request and Device Identifier from WCD

In step 504, femtocell 112 receives the registration request and a device identifier from the WCD 102. In the registration request itself, or perhaps in a separate transmission, the WCD 102 may provide to the femtocell 112 the identifier that identifies the WCD 102. As set forth above, the identifier may be, for example, a MIN or an ESN associated with the WCD 102. Of course, other identifiers could also be used. For example, the WCD 102 may be programmed to transmit a userID associated with a user as an identifier. Identifiers may be globally unique among all WCD's, locally unique among a small group of WCDs, or may be shared among a large group of related WCDs. And other implementations are certainly possible.

iii. Determine Whether WCD is Authorized to Receive Service

At step 506, and responsive to receiving the registration request, the femtocell 112 may determine whether WCD 102 is authorized to receive service. The femtocell 112 may use the identifier provided by WCD 102, or some other identifier associated with the identifier provided by WCD 102, to make the authorization determination. In one embodiment, femtocell 112 may access a whitelist of authorized WCDs and determine whether the identifier is listed in the whitelist. Such a whitelist may be stored local to the femtocell 112 or remotely from the femtocell 112.

If stored at the femtocell 112, the whitelist may be stored in a local volatile or non-volatile memory of the femtocell 112, including for example, the femtocell data storage element 310. Alternatively, the whitelist may be stored remotely at a device within the WSPN 104 and accessible by the femtocell 112 via the WAN 106. The whitelist itself may be created and/or maintained by an owner or lessee of the femtocell 112, or may be created and/or maintained by the WSPN 104.

In an embodiment, the femtocell 112 may be provided with a local interface in which a registered owner may populate the whitelist with identifiers associated with WCDs that are authorized to use the femtocell 112. In the event that the whitelist is stored remote from the femtocell 112 (e.g., at the WSPN 104), the whitelist may be populated by the wireless service provider, or perhaps the wireless service may provide an interface to allow the registered owner of the femtocell 112 to access and populate the remote whitelist. The femtocell may obtain access to the remote whitelist by, for example, transmitting a session initiation protocol (SIP) message to the WSPN 104. Alternatively, the femtocell 112 may retrieve the remotely-stored whitelist via a file transfer connection. The file transfer connection may be based on the file transfer protocol (FTP), the Hypertext Transfer Protocol (HTTP), or any other known or future developed file transfer protocol. Other possibilities exist as well.

TABLE 1

Example Whitelist Structure

| Rule | Device ID's |
| --- | --- |
| Always Allowed | 101: 3125551212 |
| Allowed Saturday-Sunday | 103: E8123DDA |

Table 1 illustrates one example data structure for the whitelist. While Table 1 shows only two WCDs and two rules, the disclosed method and apparatus is equally applicable to more or less than two WCDs and more or less than two rules. Furthermore, while the WCD reference characters in Table 1 have been chosen to correspond to the reference characters in FIG. 1 for ease of reference, it should be understood that any combination of alphanumeric characters could be used as a WCD device ID.

The data shown in Table 1 may have been previously set by a user associated with the femtocell 112, or may have been set by the wireless service provider. As shown in Table 1, WCD 101 has a mobile identification number (MIN) of 3125551212 acting as a device identifier. WCD 103 has an electronic serial number (ESN) of E8123DDA acting as a device identifier. While Table 1 utilizes varying device identifier types (ESN and MIN), a single device identifier type may be used throughout the whitelist in order to provide consistency.

In addition to setting forth authorized WCD identifiers, the whitelist may also provide access rules such as those in Table 1. As shown in Table 1, a first rule sets forth that WCD 101 is always authorized to receive service from femtocell 112. A second rule sets forth that WCD 103, on the other hand, is only authorized to receive service from femtocell 112 on Saturdays and Sundays. These or other filters can be used to customize which WCDs are allowed access to the femtocell 112 and when such WCDs are allowed access to the femtocell 112. Other whitelist data structures could be used as well, which may or may not contain access rules.

Assuming for the purposes of this example that the whitelist data structure of Table 1 is maintained at femtocell 112, and after receiving a registration request from WCD 102, femtocell 112 may then determine whether WCD 102 is authorized to receive service by comparing the identifier received from the WCD 102 (or some other identifier associated with the received identifier) with the WCD identifiers stored in the whitelist. If a match is found, femtocell 112 may proceed to step 508 and begin providing WCD 102 with wireless service. On the other hand, if a match is not found, femtocell 112 may determine that WCD 102 is not authorized to receive wireless service and proceed to step 510. In this example, given the contents of the whitelist in Table 1, and because no identifier associated with WCD 102 exists in the whitelist of Table 1, femtocell 102 would determine that WCD 102 is not authorized to receive wireless services in this example.

Despite the determination that WCD 102 is not authorized to receive wireless service, femtocell 112 may, in some cases, still provide WCD 102 with wireless service for a period of time. This period of time could be used to prevent data loss to WCD 102, or could be used to gracefully redirect WCD 102 back to the macro network, perhaps prior to taking subsequent steps that may affect WCD 102 in a less graceful manner.

Of course, instead of or in addition to a whitelist, a blacklist may be maintained locally or remotely. The operation of the blacklist may default to authorizing WCD 102 to receive service from femtocell 112 unless a matching identifier associated with WCD 102 is located in the blacklist. More specifically, if the identifier associated with WCD 102 is not present in the blacklist, the femtocell 112 may proceed from step 506 to step 508 of FIG. 5. If the identifier associated with WCD 102 is present in the blacklist, the femtocell 112 may alternatively proceed from step 506 to step 510.

In summary, responsive to femtocell 112 determining that WCD 102 is not authorized to receive wireless service, the femtocell 112 may proceed to step 510 of FIG. 5.

iv. Identify a Second Femtocell Carrier on which to Provide Service

At step 510, femtocell 112 may identify a second femtocell carrier, different from the first femtocell carrier, on which to provide service. As mentioned above, femtocell 112 may include a location module such as a GPS receiver 304 that is capable of determining a geographic location of the femtocell 112. The location information provided may then be used to retrieve, from a central database of licensed carriers, a list of licensed carriers in the geographic region in which the femtocell 112 is located. For example, a femtocell 112 may retrieve a list of all licensed carriers in a county that it is located in from a licensee database maintained by the United States Federal Communications Commission (FCC). Other methods for identifying licensed carriers could also or instead be used.

Once femtocell 112 has received a list of carriers in its geographic region, it may use the retrieved list to identify a second femtocell carrier, different than the first femtocell carrier that it was previously using, on which to provide wireless service on. The second femtocell carrier may be a shared macro-network carrier, or may be a non-shared carrier. If available, a non-shared carrier may be preferred over a shared carrier for at least the reason that the unauthorized WCD 102 is less likely to locate the femtocell 112 again on a non-shared carrier.

Of course, other methods of identifying a second femtocell carrier could also be used, including, for example, accessing a list of pre-determined alternate carriers maintained at the femtocell 112, and monitoring the wireless medium to determine other macro-network carriers that are available and/or being used in the vicinity of the femtocell 112.

v. Switch to Providing Service on the Identified Second Femtocell Carrier

Once the femtocell 112 has identified a second femtocell carrier on which to provide service, it may switch from providing service on the first femtocell carrier to providing service on the second femtocell carrier. For example, femtocell 112 may switch from providing service on the same macro-network carrier as BTS 120 of FIG. 4 (e.g., a shared carrier) to providing service on a non-shared carrier that is not used by the macro network within the vicinity of the femtocell 112. The femtocell 112 may begin transmitting one or more of its pilot channel, sync channel, and paging channel, for example, on the second femtocell carrier, and may modify its pilot beacon to transmit the new channel information on the macro-network carriers within the vicinity of the femtocell 112.

By switching to providing service on the second femtocell carrier instead of the first, the femtocell 112 may avoid the unauthorized WCD 102, and preferably prevent future attempts by the unauthorized WCD 102 to register with the femtocell 112. From its point of view, unauthorized WCD 102 may detect the absence and/or unavailability of the first femtocell carrier on which it registered, and programmatically move to a macro-network carrier provided by BTS 120. As a result of the femtocell's 112 switch, resources may be freed at the femtocell 112 to serve authorized users such as WCD 101. Furthermore, phone calls thereafter placed by the unauthorized WCD 102 may be routed via the macro-network BTS 120, and the unauthorized WCD 102 may be properly billed for use of macro-network resources.

In one embodiment, femtocell 112 may condition switching to providing service on the second femtocell carrier upon making a determination that no authorized WCDs are currently using the femtocell's 112 wireless services. As part of this process, femtocell 112 may first determine whether any authorized WCDs (such as WCD 101) are idling or receiving service on the first femtocell carrier. In order to avoid negatively affecting the service quality provided to authorized WCDs, femtocell 112 may refrain from switching to providing service on the second femtocell carrier if it detects one or more authorized WCDs. Once the authorized WCDs have each powered down and/or handed off to another service provider (e.g., to macro-network BTS 120), and only unauthorized WCDs remain on the first femtocell carrier, femtocell 112 may then proceed to switch to providing service on the second femtocell carrier.

In some embodiments, the femtocell 112 may refrain from switching to providing service on the second femtocell carrier only if one or more authorized WCDs are actively engaged in a call via the femtocell, but may switch to providing service on the second femtocell carrier if all of the authorized WCDs are simply idling on the first femtocell carrier. Prior to or after the switch, femtocell 112 may inform the authorized WCDs of the switch, but not so inform the unauthorized WCDs. In some embodiments, authorized WCDs may be provisioned (e.g., periodically and/or upon registration with the femtocell 112) with data that informs the authorized WCDs as to what may be a sequence of carriers that the femtocell 112 will try, so that authorized WCDs (but not unauthorized WCDs) will know where to look when they lose communication with the femtocell 112 on the first femtocell carrier. And certainly other similar approaches could be used.

In a further embodiment, if femtocell 112 determines that authorized WCDs are actively using the femtocell's 112 wireless services, the femtocell 112 may refrain from switching to providing service on the second femtocell carrier. After a predetermined delay, the femtocell 112 may then re-assess whether any authorized WCDs are still using the femtocell's 112 wireless services. At this time, if no authorized WCDs remain, the femtocell 112 may switch to providing service on the different carrier. If, on the other hand, authorized WCDs still remain, the femtocell may wait for a second longer delay, cancel the switch, or perhaps provide the authorized WCD(s) with an indication of the second femtocell carrier that the femtocell 112 is switching to and switch to the second femtocell carrier. Other possibilities exist as well.

In another embodiment, if femtocell 112 switches to providing service on a second femtocell carrier that is also a shared carrier, and unauthorized WCD 102 sends a second registration request to femtocell 112 on the shared second femtocell carrier, femtocell 112 may then identify and switch to providing service on a non-shared carrier in order to facilitate further avoiding unauthorized WCD 102.

In an additional embodiment, the femtocell 112 may refrain from switching to providing service on the second femtocell carrier until at least a threshold number of unauthorized WCDs become registered with the femtocell 112. For example, the femtocell 112 may refrain from switching to providing service on a different carrier until at least two or more unauthorized WCDs are registered with the femtocell 112. Subsequently, the femtocell 112 may redirect one or more, perhaps all, of the unauthorized WCDs to a macro-network carrier in the same or similar manner as set forth above.

3. Conclusion

In accordance with the foregoing embodiments, a number of unauthorized WCDs on a femtocell may be reduced. As a result, the femtocell may prevent unauthorized WCDs from using resources that may then be properly allocated to the registered owner (or owners) of the femtocell, and may additionally prevent siphoning of revenue that would otherwise be collected by the carrier for the unauthorized WCD's use of the carrier's macro-network resources. And certainly other advantages are achieved as well.

Various exemplary embodiments have been described above. Those skilled in the art will understand, however, that changes and modifications may be made to those examples without departing from the scope of the claims.

The invention claimed is:

1. A method comprising:
   a femtocell initially providing wireless service on a first femtocell carrier;
   the femtocell receiving a registration request from a wireless communication device (WCD) on the first femtocell carrier;
   responsive to receiving the registration request, (i) the femtocell evaluating whether the WCD is authorized to receive wireless services from the femtocell, and (ii) the femtocell making a carrier-switch determination comprising a first determination that the WCD is not authorized to receive wireless service from the femtocell, wherein making the first determination that the WCD is not authorized to receive wireless service from the femtocell is based on a reference to a WCD list selected from the group consisting of a whitelist and a blacklist; and
   responsive to making the carrier-switch determination, the femtocell switching to providing service on a second femtocell carrier different than the first.

2. The method of claim 1, wherein the first femtocell carrier and second femtocell carrier are also macro-network carriers on which a macro network provides wireless service.

3. The method of claim 2, further comprising, the femtocell receiving a second registration request from the unauthorized WCD on the second femtocell carrier, and responsively switching to providing service on a third femtocell carrier different than the second, wherein the macro network is not at the time providing service on the third femtocell carrier within a communication range of the femtocell.

4. The method of claim 1, wherein the second femtocell carrier is one not used by a macro network within a communication range of the femtocell.

5. The method of claim 1, wherein the carrier-switch determination further comprises a second determination that at least a threshold number of unauthorized WCDs are currently registered with the femtocell.

6. The method of claim 1, wherein the carrier-switch determination further comprises a second determination that no authorized WCDs that are currently registered with the femtocell are currently engaged in an active communication session over the femtocell carrier.

7. The method of claim 1, further comprising the femtocell providing the WCD with wireless service prior to switching to providing service on the second femtocell carrier.

8. The method of claim 1, wherein the list is a whitelist maintained at the femtocell, wherein evaluating whether the WCD is authorized to receive wireless service from the femtocell comprises checking for the presence of an identifier associated with the WCD in the whitelist, and wherein the first determination comprises a determination that the identifier associated with the WCD is not present in the whitelist.

9. The method of claim 1, wherein evaluating whether the WCD is authorized to receive wireless services from the femtocell comprises (i) transmitting an authorization request to a whitelist database external to the femtocell and (ii) examining a content of an authorization reply received by the femtocell from the whitelist database, the authorization reply being associated with the authorization request.

10. The method of claim 1, further comprising the femtocell selecting the second femtocell carrier at least in part by (i)

retrieving from a data store a list of available carriers identified based at least in part on a geographic location of the femtocell and (ii) selecting the second femtocell carrier from the retrieved list.

11. The method of claim 1, wherein the first femtocell carrier is a shared femtocell and macro-network carrier, the method further comprising the femtocell refraining from transmitting a pilot beacon on the first femtocell carrier for a first period of time after switching to providing service on the second femtocell carrier.

12. A femtocell comprising:
a communication interface;
a processor; and
data storage containing instructions executable by the processor for causing the femtocell to carry out a set of functions including:
initially providing wireless service on a first femtocell carrier;
receiving a registration request from a wireless communication device (WCD) on the first femtocell carrier;
responsive to receiving the registration request, (i) evaluating whether the WCD is authorized to receive wireless service from the femtocell, and (ii) making a carrier-switch determination comprising a first determination that the WCD is not authorized to receive wireless service from the femtocell, wherein the first determination that the WCD is not authorized to receive wireless service from the femtocell is based on a reference to a WCD list selected from the group consisting of a whitelist and a blacklist; and
responsive to making the carrier-switch determination, switching to providing service on a second femtocell carrier different than the first.

13. The femtocell of claim 12, wherein the first femtocell carrier and second femtocell carrier are also macro-network carriers on which a macro network provides wireless service.

14. The femtocell of claim 13, the set of functions further comprising receiving a second registration request from the unauthorized WCD on the second femtocell carrier, and responsively switching to providing service on a third femtocell carrier different than the second, wherein the macro network is not at the time providing service on the third femtocell carrier within a communication range of the femtocell.

15. The femtocell of claim 12, wherein the second femtocell carrier is one not used by a macro network within a communication range of the femtocell.

16. The femtocell of claim 12, wherein the carrier-switch determination further comprises a second determination that at least a threshold number of unauthorized WCDs are currently registered with the femtocell.

17. The femtocell of claim 12, wherein the carrier-switch determination further comprises a second determination that no authorized WCDs that are currently registered with the femtocell are currently engaged in an active communication session over the femtocell carrier.

18. The femtocell of claim 12, the set of functions further comprising providing the WCD with wireless service prior to switching to providing service on the second femtocell carrier.

19. The femtocell of claim 12, wherein the list is a whitelist maintained at the femtocell, wherein evaluating whether the WCD is authorized to receive wireless service from the femtocell comprises checking for the presence of an identifier associated with the WCD in the whitelist, and wherein the first determination comprises a determination that the identifier associated with the WCD is not present in the whitelist.

20. The femtocell of claim 12, wherein evaluating whether the WCD is authorized to receive wireless services from the femtocell comprises (i) transmitting an authorization request to a whitelist database external to the femtocell and (ii) examining a content of an authorization reply received by the femtocell from the whitelist database, the authorization reply being associated with the authorization request.

21. The femtocell of claim 12, the set of functions further comprising selecting the second femtocell carrier at least in part by (i) retrieving from a data store a list of available carriers identified based at least in part on a geographic location of the femtocell and (ii) selecting the second femtocell carrier from the retrieved list.

22. The femtocell of claim 12, wherein the first femtocell carrier is a shared femtocell and macro-network carrier, the set of functions further comprising refraining from transmitting a pilot beacon on the first femtocell carrier for a first period of time after switching to providing service on the second femtocell carrier.

* * * * *